D. W. HOSHALL
Seed-Planter.
No. 210,535. Patented Dec. 3, 1878.
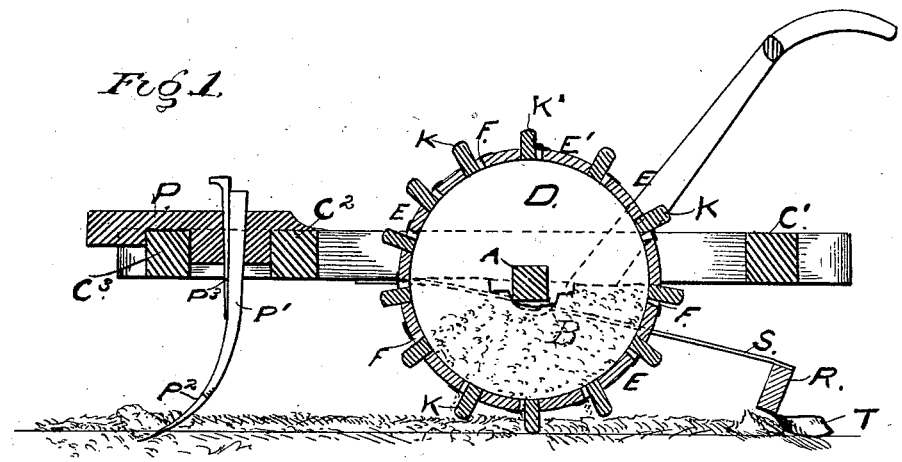
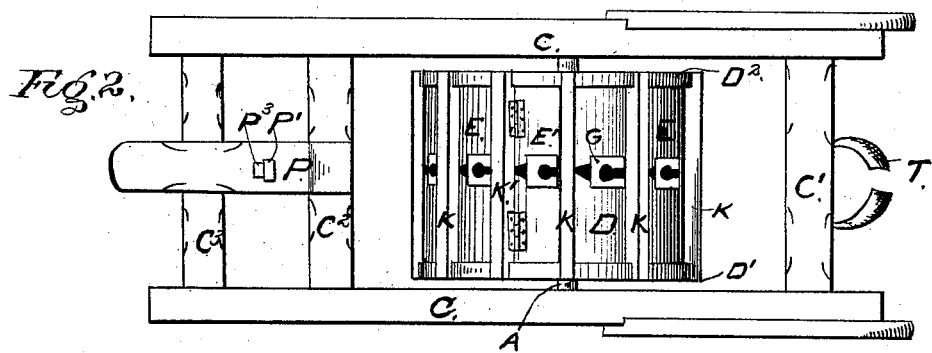
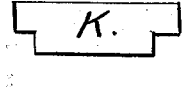
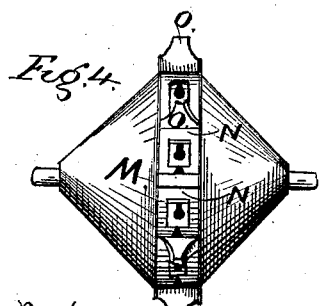
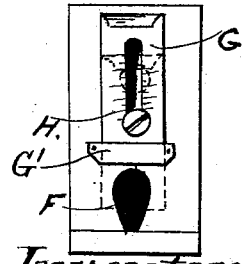
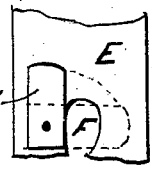
Witnesses:
Inventor:
David W. Hoshall,
per
Kirk and Fowler,
Attorneys

UNITED STATES PATENT OFFICE.

DAVID W. HOSHALL, OF DALLAS, TEXAS.

IMPROVEMENT IN SEED-PLANTERS.

Specification forming part of Letters Patent No. 210,535, dated December 3, 1878; application filed May 8, 1878.

*To all whom it may concern:*

Be it known that I, DAVID W. HOSHALL, of Dallas, in the county of Dallas and State of Texas, have invented certain new and useful Improvements in Seed-Planters; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to provide a machine that can be regulated so as to plant any size or kind of grain or seed, from the smallest to the largest, and to plant or drill said seed at any desired distance apart.

The nature of the invention will be described in the specification, and pointed out in the claims.

In the accompanying drawing, in which similar letters of reference indicate corresponding parts, Figure 1 represents a longitudinal section. Fig. 2 is a plan view. Fig. 3 represents one of the radiating projections. Fig. 4 is a modified view, showing a convex-shaped drum. Fig. 5 represents a regulator, G. Fig. 6 represents the regulator on the inner side.

A represents an axle, suitably journaled in bearings B B, which are secured to the under side of frame C C.

The drum D is preferably made of two side pieces, $D^1 D^2$, and secured to the same are a number of sections, E E. These sections have each an aperture, F, as shown, and through which the seed to be planted passes from the drum to the ground. On these sections E, and held there by suitable means, are the slides or regulators G. These regulators are preferably made in the form shown in Fig. 5, and are so constructed that the passage of the seed can be entirely cut off or regulated according to the quantity to be drilled or planted.

If it is desired to drill the seed some distance apart, by closing a few of the apertures the desired distance is obtained, and by simply sliding the slides H back the seeds may be planted very close together.

On the under or inner side of each of the sections E, and secured to the same by a screw or bolt, on which it turns, is another slide or regulator, V, as shown in Fig. 6, which prevents the seed from clogging the aperture F.

The radiating arms or projections K are preferably made in the form shown in Fig. 3, and their shorter sides are placed between each of the sections E, and their shorter sides are also secured to the sides of drum D by small bolts or other suitable means. The inner side of said projections K terminate on the line of the inner surface of sections E, thereby providing a smooth circular surface on the inside of the drum, so that there may be no impediment to the seed seeking the lower part of the drum as the same revolves, and thus securing that, however small amount of seed there may be in the drum, it will come in contact with the opening nearest the ground, through which it passes to the ground. To one of these projections K' is hinged the section E', which is thus allowed to be opened, and through which the grain to be planted is passed into the drum D. This is then closed, and may be held by a small snap or other suitable means.

The projections K are made to project outward from the periphery of sides $D^1 D^2$ of drum D, and thus prevent the apertures F from clogging with dirt, as these projections are the first part that comes into contact with the ground, and they being projected beyond the periphery of the sides of the drum keep the same from touching the ground at any point whatever.

It is obvious that a convex-shaped drum, M, may also be used for this purpose. This drum has also the different sections N and projections O, as shown, and which is to be operated the same as that already described.

Between the frames C C is the stay or cross-piece $C^1$, which connects said frames together at their rear end. $C^2$ and $C^3$ are also stays or cross-pieces in the fore part of the machine. The tongue or shaft P, by which the machine is drawn, is secured to stays $C^2 C^3$, and also has an aperture, through which is passed the standard $P^1$, carrying the shovel $P^2$. This standard $P^1$ can be regulated by means of the wedge $P^3$, so as to make a deep or shallow furrow.

To the under side of frames C C, and bearing against the journal-bearings B B, are secured flat springs S S, which carry at their rear a beam, R, and in the center of this beam is the cover T, formed of two converging pieces, which closes the furrow made by the shovel P¹ in the fore part of the machine.

It is obvious that the projections striking the ground as the drum revolves, the concussion of the same will facilitate the passage of the seed through the apertures F, thence in the furrow, after which the coverer T immediately follows, covering the seed.

Thus it is shown that the furrow is made or opened, the seed planted, and the furrow closed (after the seed is planted) by the one machine and by the one operation; and it is claimed that the above machine may be constructed so cheaply as to gain a great saving in the cost of implements for the above purpose.

Having thus fully described my invention, what I claim as new, and desire to secure by Letters Patent, is—

1. In a planter, the circular drum D, in combination with sections E and projections K, the said projections K being situated between the sections E, as shown and described.

2. In a planter, the circular drum D, composed of sides D¹ D², sections E, and projections K, the under side of projections K terminating on the line of the inner surface of sections E, as and for the purpose set forth.

3. In a planter, the circular drum D, in combination with the T-shaped projections K and sections E, said sections having slides or regulators G on their outer face, substantially as described, and for the purpose set forth.

In testimony that I claim the foregoing as my own I affix my signature in presence of two witnesses.

DAVID W. HOSHALL.

Witnesses:
R. E. BUMPAS,
VAL. E. WINSTON.